Jan. 9, 1940.  T. DE PORT  2,186,011
SHOCK ABSORBER
Filed Sept. 29, 1938   3 Sheets-Sheet 1
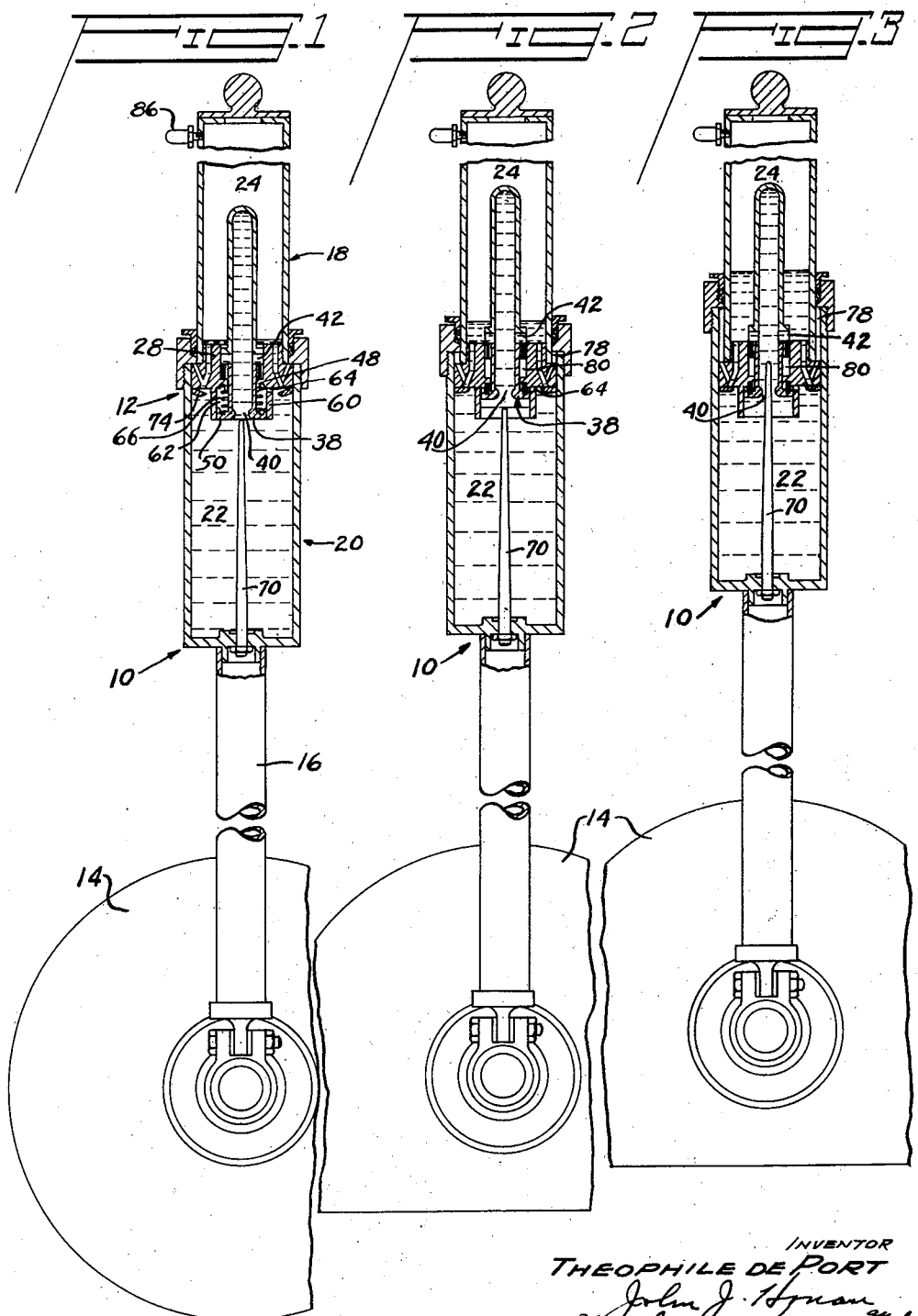

Jan. 9, 1940. T. DE PORT 2,186,011
SHOCK ABSORBER
Filed Sept. 29, 1938 3 Sheets-Sheet 2
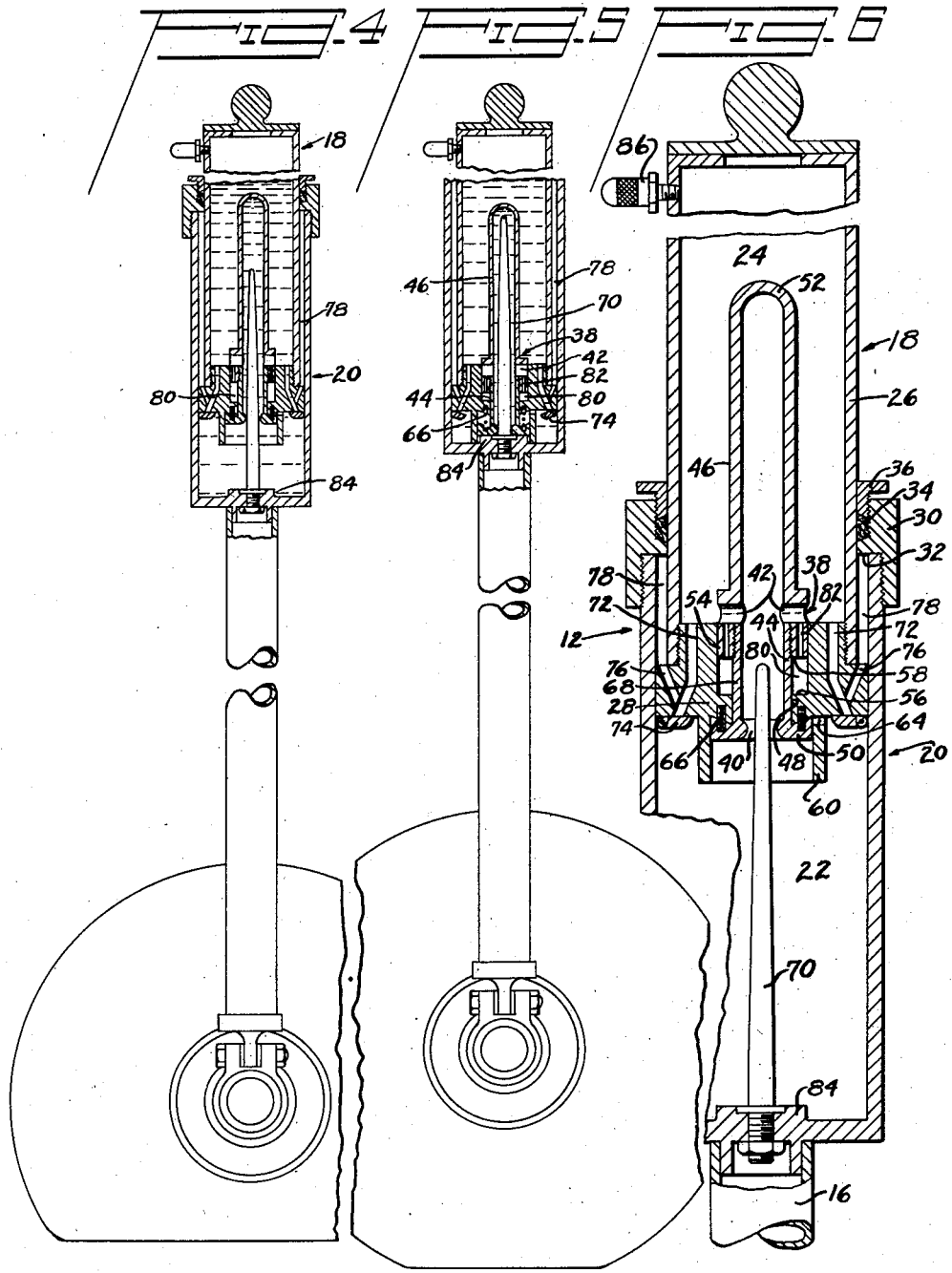
INVENTOR
THEOPHILE DE PORT
ATTORNEYS Jan. 9, 1940. T. DE PORT 2,186,011
SHOCK ABSORBER
Filed Sept. 29, 1938 3 Sheets-Sheet 3
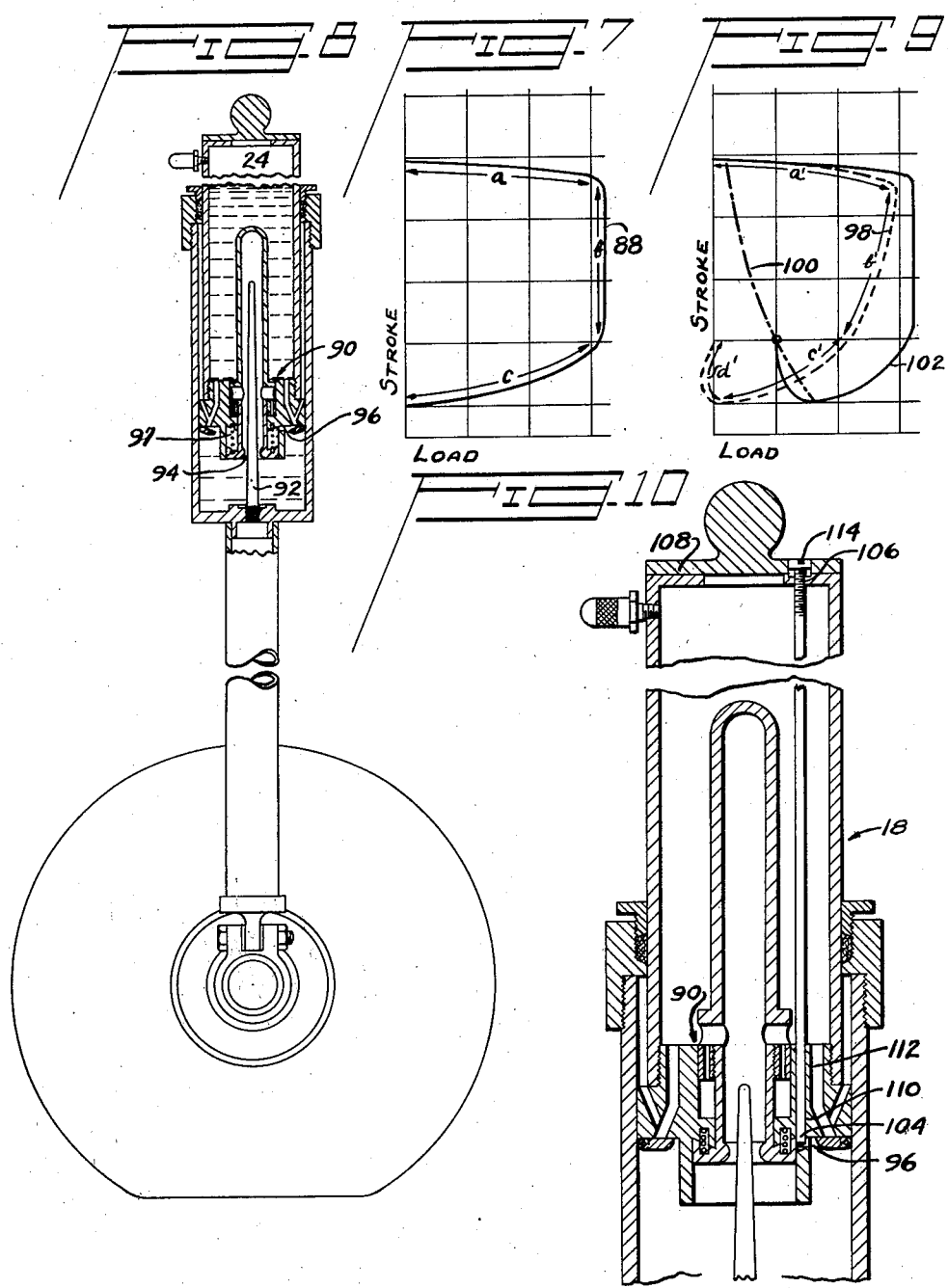
INVENTOR
THEOPHILE DE PORT
ATTORNEYS Patented Jan. 9, 1940

2,186,011

UNITED STATES PATENT OFFICE 2,186,011

SHOCK ABSORBER

Théophile de Port, New Carlisle, Ohio

Application September 29, 1938, Serial No. 232,361

35 Claims. (Cl. 267—64)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to shock absorbers, and particularly to oleo shock absorbers for use in connection with a resilient suspension medium, and is especially useful in connection with landing gears for airplanes and other aircraft.

The present invention contemplates broadly an improved shock absorber embodying novel fluid-flow control means.

Another object of my invention is to provide an oleo shock absorber with novel means to control the flow of fluid in said shock absorber in such a manner as to obtain an abruptly increasing resistance within the limits of the maximum allowable load during the deflection of the resilient suspension medium with which said shock absorber is associated and to thereafter maintain said load constant throughout a major portion of the stroke of the shock absorber.

It is another object of my invention to provide in an oleo shock absorber novel fluid flow control means which operate in such a manner as to reduce to a minimum the relative displacement of the displaceable elements of the shock absorber during the deflection of the resilient suspension medium of the craft.

Still another object of my invention contemplates novel fluid flow control means carried by one of the displaceable elements of the shock absorber and movable relatively thereto for controlling the flow of fluid between chambers.

It is a further object of my invention to provide in an oleo shock absorber pressure differential valve means operative in response to the rate of application of pressure for controlling an orifice opening including means for controlling the time of opening of the said valve means in accordance with a predetermined time deflection characteristic of the resilient suspension medium of the craft.

It is a further object of my invention to provide in an oleo shock absorber pressure differential valve means operative in response to the rate of application of pressure for controlling an orifice opening including adjustable means for regulating the time of opening of the said valve means in accordance with a predetermined time deflection characteristic of the resilient suspension medium of the craft.

Still another object of my invention is to provide an oleo shock absorber with novel means cooperating with an orifice during the initial part of the stroke and further means cooperating with said orifice, to control the flow of fluid.

Still another object of my invention is to provide in an oleo shock absorber having a static load supporting resilient medium, a valve means responsive to the rate of application of pressure for preventing the flow of fluid during any deflection of the resilient suspension medium of the craft which increases the load on said shock absorber at different predetermined static positions of the displaceable elements of the shock absorber.

In my co-pending applications, Serial Nos. 533,110 and 582,362, I have shown and described a means and method, broadly, for dissipating the kinetic energy of a landing aircraft by causing the resilient means, such as the tire, and the oleo shock absorber, to operate in such a manner that displacement of the movable elements of the oleo shock absorber is restrained to provide first an abruptly increasing resistance in the shock absorber within the limits of the maximum allowable load during the deflection of the tire, thereafter permitting the displaceable elements to move relative to each other to displace liquid in the shock absorber and thereby dissipate the kinetic energy of the falling body and the potential energy absorbed by the tire. For this purpose I have shown and disclosed therein an oleo shock absorber in which metering means is provided for metering the fluid through a controlled orifice, the controlling of the orifice being accomplished by means of a metering pin carried by one of the liquid displacing elements and cooperating with an orifice in the other of the liquid displacing elements, the pin being shaped to provide varying orifice areas substantially throughout the length of the stroke to produce the desired results.

Since it is impossible to determine when the maximum allowable load or resistance is developed in the shock absorber corresponding to the maximum deflection of the tire, the change from the maximum restriction to fluid flow to the minimum restriction to fluid flow corresponding to the maximum allowable load is graduated over a portion of the piston stroke that occurs during the deflection of the tire to insure that the maximum allowable load in the shock absorber will not be exceeded when the velocity of the falling body is transferred from the tire to the shock absorber.

It is apparent that the more gradual the change in opening for preventing the building up of excessive loads, the greater will be the portion of the piston stroke consumed during the deflection of the tire. When this change in the restriction of the orifice is controlled by the relative movement of the liquid displacing elements, the amount of liquid displaced and the extent of stroke will be directly proportional to the relative movement of the liquid displacing elements of the shock absorber.

Other advantages of my invention will be apparent from the following description and accompanying drawings, wherein like reference characters refer to like parts throughout the several views:

Fig. 1 is a vertical side elevational view of an oleo leg and tire arrangement embodying my invention, showing the same in fully extended position, with parts broken away and in section;

Figs. 2, 3, 4 and 5 are similar views showing the relation of the displaceable elements and tire at four consecutive stages, respectively, in landing;

Fig. 6 is an enlarged detail view of the shock absorber in the same stage as in Fig. 3;

Fig. 7 is a graphical diagram showing the operation of the shock absorber shown in Fig. 1;

Fig. 8 is a view similar to Fig. 1 showing a further embodiment of my invention wherein compressed gas is used as a static load supporting medium;

Fig. 9 is a graphical diagram showing the operation of the shock absorber shown in Fig. 8; and Fig. 10 shows a variation of my invention.

Referring to the drawings, the oleo leg 10 shown in Figs. 1 to 5, as illustrated, constitutes a strut of a conventional landing gear, including a shock absorber 12 that is connected, at its lower end to a landing wheel 14 through an extension rod 16, and at its upper end, to the airplane wing or fuselage by a suitable connection such as a ball and socket connection. The shock absorber 12 includes a piston-cylinder 18 and a cylinder 20 that are telescopically arranged to be collapsed and extended. The lower cylinder 20 constitutes a working chamber 22 and the piston-cylinder 18 forms a reservoir chamber 24, the two chambers being adapted for communication therebetween.

As best seen in Fig. 6, the piston-cylinder 18 comprises a cylinder 26 and a piston head 28. The piston-cylinder 18 is restrained in the cylinder 20 by means of a collar nut 30 having an inwardly protruding flange 32 to make peripheral contact with the cylinder 26, and the joint so made is further sealed against leakage by a suitable packing 34 and a packing nut 36. The piston head 28 is therefore seen to be slidable with respect to the cylinder 20, and the cylinder 18 is slidable with respect to the flange 32, packing 34, and packing nut 36, thereby permitting the collapsing of the cylinder 18 within the cylinder 20 and the subsequent extension of the two cylinders.

As illustrated, the piston head 28 is provided with valve means to enable the transfer of fluid from one chamber to the other through the piston as the latter is reciprocated in the cylinder 20. The displacement of fluid from the working chamber during the initial part of the stroke is novelly controlled by a pilot controlled valve 38 carried by the piston head 28 but movable relatively thereto between an open and a closed position.

This valve is of the pressure-differential type and is in the form of a tubular member with an open lower end 40, closed at the upper end, and provided with transverse orifices 42 located intermediate of the ends of the tube so that the orifices 42 are sealed within the piston in the closed position of the valve as shown in Fig. 1 and clear the piston in the open position as shown in Fig. 2. It is thus seen that communication between the working chamber 22 and the reservoir chamber 24 is established by the valve 38 in the open position through the orifices 40 and 42.

In order to facilitate the assembly of the valve member 38 with the piston, it is preferably made of two tubular elements 44 and 46 that are threadedly connected together. The element 44 is adapted to be slidably received within a central bore 48 of the piston, and provided with a radially extending flanged end 50. The element 46 has a closed end 52 and a shouldered portion 54, at its open end, adapted to be slidably received within a counterbored portion 56 of the piston and to abut with the bottom of said counterbored portion. The tubular element 46 contains the transverse orifices 42 located at a distance from the shoulder end 58 less than the depth of the counterbored portion of the piston, so as to be received within the piston when the valve 38 is closed.

The flange 50 and the outer wall of the element 44 in the closed position provide with a depending annular portion 60 of the piston a chamber 62 (Fig. 1) that has an orifice 64 for establishing communication between the chamber 62 and the working chamber 22. The valve 38 operates as a piston for displacing fluid from the chamber 62. Although the valve 38 moves in response to a pressure difference in chambers 22 and 24, the time interval of its movement is controlled by the metering of the fluid in the chamber 62 through the orifice 64 which is of such a size as to regulate the time for exhaustion of the fluid from the chamber 62, and the consequent movement of the valve 38, to correspond with the time interval of the deflection of the suspension medium or tire for a predetermined load. The metering of the fluid in the chamber 62 through the orifice 64 is therefore seen to be in the nature of a pilot control of the operation of the piston valve 38. A spring 66 of small capacity placed between the portion 48 of the piston the flange 50 serves to urge the valve into closed position when not under pressure.

It is now appreciated that the annular element 44 must have its body portion 68 of such a length with respect to the piston bore 48 that when the elements 44 and 46 are connected together, abutment of the flange 50 with the piston portion 48 will cause the orifice 42 to extend within the chamber 24, and that when the shoulder end 58 is in abutment with the bottom of the counterbore 56, as in the closed position, the flange 50 is still retained within the depending portion 60 of the piston.

After communication has been established between cylinders 22 and 24 by means of the valve 38, the transfer of fluid therethrough, as illustrated, is thereafter controlled by a tapered metering pin 70 that is threadedly connected to the bottom of cylinder 20 and adapted to register with orifice 40. Since the metering pin is received within the valve member 38 during operation of the shock absorber, it is obvious that the combined length of the elements 44 and 46 must be sufficient to contain the metering pin when the cylinders are in a collapsed position as shown in Fig. 5.

The orifice 40 in the annular element 44 is preferably formed with rounded edges, or streamlined to effect a laminar flow of the liquid and thereby prevent a foaming of the liquid during transfer therethrough. The said orifice is of such diameter and the metering pin 70 of such size and shape that they cooperate to provide a varying orifice area throughout the stroke, the variations of said orifice area being predetermined in relation to the load desired.

The piston head 28 is provided with conduits 72 connecting the chambers 22 and 24. Flap valves 74 on the working face of the piston close the conduits in response to pressure in the lower cylinder, but open to permit the return of fluid to the lower cylinder from the upper cylinder during the extension of the cylinders. The piston is further provided with conduits 76 connecting the space 78 between the cylinder walls with the conduits 72 in order to vent the space 78 formed between the cylinder walls when the cylinders are collapsed.

The cycle of operation is shown by reference to Figs. 1 to 5. The shock absorber is normally filled with a suitable shock absorber fluid to a level above the piston when the cylinders are in the extended position. The filling with fluid is accomplished through the valve 86 hereinafter described, or through the hole in which said valve is mounted. The valve 38 is also preferably filled with liquid, which is easily accomplished by inverting the shock absorber before assembly in the landing gear. In Fig. 1, the shock absorber unit is extended and ready for operation on contact with the ground. The tire is in the non-deflected condition. The valve 38 is in the closed position, wherein the chamber 62 is filled with fluid.

When contact is established between the tire and the ground, hydraulic pressure builds up in the working chamber 22 which causes the flap valves 74 to close and the pressure on the valve 38 urges it towards the open position. The fluid in the chamber 62 is forced out through the restricted metering orifice 64. As the fluid is forced from chamber 62, it is displaced into the work chamber 22 and takes up the space made available by the displacement of the valve 38 into the chamber 24.

In Fig. 2, the valve 38 has been moved into the open position, bringing orifices 42 into registry with the upper chamber 24, thereby establishing communication between chambers 22 and 24 through orifices 40 and 42. In this operation, the chamber 62 has been completely collapsed. Due to the displacement of valve 38 into chamber 24, a slight relative movement of the telescoping cylinders 18 and 20 occurs. To reduce this relative motion to a minimum, it is desirable that the valve 38 be filled with liquid.

It is to be observed that the communication between the chambers 22 and 24 is controlled by the valve 38, which is actuated upon landing by a pressure difference in the two chambers, but is controlled in its rate of opening by the metering orifice 64. Therefore, it is to be seen that for a given size metering orifice the opening of the valve 38 depends on the rate of application of pressure in the chamber 22, and not on any predetermined pressure differential. It is thereby seen that the rate of opening is regulated in conformance with the same forces that operate on the tire, and is such that the time of opening is made to correspond with the time deflection characteristic of the tire, so that the transfer of fluid from chamber 22 to chamber 24 will be delayed until the tire has been deflected to its maximum for a particular load. In this manner, the maximum load on the shock absorber is reached with a minimum consumption of stroke.

In Fig. 3, the tire remains at its maximum deflection, while the piston, now that communication has been established between the lower and upper chambers, starts downward on its stroke while transferring oil through the passage defined by the orifices 40 and 42. As illustrated, the metering pin 70 has also entered the orifice 40 and has begun the restriction of fluid flow through the orifice, and because of its contoured shape, varies the effective cross-sectional area of the orifice and the hydraulic resistance for the remainder of the stroke. This varying orifice area is predetermined throughout the stroke with respect to the changing velocity of the mass, and is such that for a major portion of the stroke a substantially constant load is obtained.

Fig. 4 shows the piston at the point in its stroke where the velocity of the mass has been reduced to such an extent that the energy absorbed in the tire during its initial deflection is about to be dissipated through the shock absorber. As the piston-cylinder 18 and the cylinder 20 are further relatively displaced to the position shown in Fig. 5, the energy absorbed by the tire is dissipated by the hydraulic resistance of the varying orifice in the last portion of the stroke, and the tire assumes its normal shape under the normal static load of the craft.

In Fig. 5, the hydraulic pressure in the lower chamber has been equalized with that in the upper chamber. The spring 66 actuates the valve 38 toward its normal position. The oil in the chamber 80, which chamber is formed by the movement of the valve 38 into the open position, is vented through the conduits 82 and orifices 42. It will be seen that, while the valve 38 is arrested in its return to normal closed position by the boss 84 provided at the base of the lower chamber for reinforcing the support of the metering pin 70, it is obvious that when the displaceable elements of the shock absorber are again extended, the valve 38 will again return to the normal closed position.

The shock absorber strut, in the absence of a substantial amount of compressed gas in the reservoir chamber 24 or of the use of some expansion means having a capacity at least equal to the weight of the airplane, will assume the static position shown in Fig. 5 when the airplane is at rest on the ground.

Upon taking off of the aircraft, the shock absorber strut will again assume the extended position shown in Fig. 1, in response to the action of gravity. As the cylinders are extended, the flap valves 74 being in their open position, the liquid in the reservoir chamber 24, as well as in the space 78, is transferred to the working chamber 22 through the passages 72 and 76 respectively.

At the top of cylinder 18 is mounted a valve 86 for the introduction of compressed gas into the reservoir chamber 24, preferably in sufficient amounts to facilitate the extension of the extensible members, should this be desirable.

While I have shown and described means for obtaining a predetermined varying orifice area substantially throughout the length of the stroke by a relative movement of the piston and cylinder through the utilization of a metering pin cooperating with an orifice in the differential valve, it will be understood that such varying orifice may be obtained by a relative movement between the differential valve and its supporting member or by any other suitable, equivalent means.

To illustrate the operation of my invention graphically, there is shown in Fig. 7 a curve 88 representing the pure hydraulic resistance developed by the shock absorber. The curve consists of an abrupt initial rise $a$ corresponding to the load built up during the time that communication between the chambers 22 and 24 is prevented, which occurs during the progress of the displaceable elements from the stage shown in Fig. 1 to that in Fig. 2, which is the period when the tire is being deflected, a load of constant value $b$ obtaining throughout a major portion of the stroke (Figs. 2 to 4) obtaining when the tire is deflected to its maximum, and a final decrease $c$ in the resistance load to zero, less sharp than the initial rise, which corresponds to the part of the stroke during which the energy of the tire is dissipated as described in the stage from Fig. 4 to Fig. 5. In this embodiment of my invention, the load in the shock absorber due to the hydraulic resistance being identical with the external load on the shock absorber, is represented by the same curve 88.

Fig. 8 shows a shock absorber similar to that shown in Figs. 1 to 6, in which the reservoir chamber 24 is provided with gas under a pressure sufficient to partially distend the shock absorber displaceable elements and suspend the static load of the aircraft. Similarly to the first described embodiment, this shock absorber is provided with a fluid control valve 90 and a metering pin 92 cooperating with an orifice 94 in the valve to control the flow of fluid from the working chamber to the reservoir chamber during the operation of the shock absorber both in landing and in taxiing. The valve 90 and metering pin 92 are designed, taking into consideration the resistance set up by the pneumatically loaded condition of the shock absorber, to operate in substantially the same manner as the valve 38 and metering pin 70 described in Figs. 1 to 6. It will be obvious that the time required for opening the valve in this embodiment will be less than the time deflection of the valve in the first described embodiment, during landing, by an interval equal to the interval of time required to obtain equilibrium between the compressed gas load exerted in the valve and the load on the tire, and therefore, provision must be made to enable faster movement of the valve 90 than in the prior embodiment, which is accomplished, as illustrated, by constructing the pilot metering orifice 96 of slightly larger diameter than the corresponding orifice 64 in the first described embodiment. This provision may also be accomplished by suitably varying the length or cross-sectional area of the chamber 97 corresponding to the chamber 62 in the first described embodiment.

The effective orifice area as determined by the metering pin and the orifice in the valve is designed to produce a resistance which, with the other resistances of the shock absorber, such as the pneumatic resistance, will produce the desired load curve characteristic throughout the piston stroke.

It will be further obvious that, if desired, the shock absorber may be provided with a spring for supporting the static load of the aircraft in the well-known manner.

The operation of this embodiment is similar in principle to the operation of the shock absorber shown in Figs. 1 to 6, and any variations in the detail of the operation are due to the suspended static load position of the piston-cylinder assumed because of the compressed gas. In the downstroke of the piston, while the shock absorber is absorbing the kinetic energy of the craft, the piston will travel beyond its static load position, and then travel upwardly, returning to the static load condition as equilibrium is established in the shock absorber. This operation is further illustrated by the graph in Fig. 9 in which the curves of both hydraulic and compressed gas resistance are shown in dotted and dot-and-dash lines, 98 and 100 respectively. The total load is shown in the solid line 102. It will be seen that the compressed gas resistance starting initially from a relatively small amount increases regularly in an adiabatic curve to a relatively large amount at the end of the stroke. In the downstroke the hydraulic resistance increases abruptly initially $a'$, then gradually decreases $b'$ during a major portion of the stroke, and tapers off gradually at the end $c'$. The hydraulic resistance curve 98 contains a further portion $d'$ representing the negative resistance incurred during the upstroke of the piston after the piston has traveled the full length of the downstroke. This upstroke is the result of the gas pressure in the chamber 24 returning the piston to the static load condition shown in Fig. 8. The hydraulic resistance curve shown in this figure differs from that shown in Fig. 7 by reason of the modification in the design of the fluid control means used in combination with compressed gas resistance. The curve 102 in Fig. 9 represents the sum of the hydraulic and compressed gas resistance during the operating cycle of the shock absorber.

It is obvious that further combinations could be made of various well-known resistance means, such as mechanical springs and friction, especially by combining more than two such means, and in that event the physical structure of the fluid control means would have to be so modified that the total resistance of all the means utilized would produce the result represented by curves 88 in Fig. 7 or 102 in Fig. 9.

Fig. 10 shows a variation of my invention which may be utilized with either of my foregoing embodiments, and is illustrated as being used with the embodiment shown in Fig. 8. In this variation, provision is made for adjusting the time of opening of the valve 90 in accordance with the time deflection characteristic of the resilient suspension medium with which the shock absorber is associated, or in accordance with resistance due to friction caused by the cylinder packing and that due to friction of the piston and cylinder guide in landing, or to compensate for leakage between relatively movable parts of the valve when shock absorber is operating. To accomplish this adjustment, the metering orifice 96, controlling the movement of the valve 90 from closed to open position, is varied or adjusted by means of a gate valve 104 disposed within the cylinder 18, said gate valve being threadedly connected at its upper end 106 with the cylinder head 108, and is slidably received in close fitting relationship in a guide 110 in the piston head 112. The gate valve 104 is provided with a slotted head 114 for adjusting the same externally of the shock absorber. The threads at 106 are made airtight by suitable means. By rotating the valve, minute variations in the size of the orifice is obtained.

It is to be understood that my invention is not limited to the forms which are shown and described, but that various changes may be made without departing from the spirit thereof and the scope of the appended claims.

I claim:

1. In a shock absorber, a pair of relatively movable elements, one of said elements having an orifice through which fluid is transferred to dissipate energy and having pressure differential means carried thereby and movable relative thereto to control the transfer of fluid through said orifice as a function of the rate of application of pressure between said elements and hydraulic resistance means cooperating with said pressure differential means to delay the opening of said orifice for the time required to develop a predetermined load in accordance with a predetermined time-deflection curve characteristic.

2. A shock absorber, of the fluid displacement type, comprising, a cylinder member, a piston member movable therein, one of said members having an orifice for transferring fluid therethrough and pressure differentially operated piston means carried by and movable relative thereto to control the transfer of fluid through said orifice as a function of the rate of application of pressure and hydraulic resistance means cooperating with said pressure differential means to delay the opening of said orifice for the time required to develop a predetermined load in accordance with a predetermined time-deflection curve characteristic.

3. In a shock absorber having two relatively movable elements forming a working chamber and a reservoir chamber and having an orifice therebetween through which fluid is transferred to dissipate energy, an hydraulic resistance controlled valve means carried by one of said elements to control said orifice, said valve means comprising an auxiliary working chamber having a restricted orifice therein and a piston member movable in said chamber, said valve means being so constructed and arranged with respect to said first mentioned orifice so as to delay the opening of said orifice for the time required to develop a predetermined load in accordance with a predetermined time-deflection curve characteristic.

4. In a shock absorber having two relative removable elements forming a working chamber and a reservoir chamber one of said elements having an auxiliary working chamber provided with a restricted orifice and a piston member in said auxiliary chamber movable relative thereto, said piston member having a communicating path between said first two mentioned chambers and being operable as a function of the rate of change of pressure between said chambers for regulating the flow of fluid through said communicating path in accordance with said rate of change of pressure.

5. In a shock absorber having two relatively movable elements forming a working chamber and a reservoir chamber and having an orifice therebetween through which fluid is transferred from one chamber to the other to absorb energy, one of said elements having a restricted orifice and a piston member carried by said element and movable relative thereto for effecting a transfer of fluid through said restricted orifice as a function of the rate of change of pressure between said chambers to thereby control the initial restriction of said first mentioned orifice in accordance with said rate of change of pressure, and means cooperating with said orifice to vary the cross-sectional area thereof in predetermined relation to the stroke.

6. In a shock absorber, a pair of relatively movable elements, one of said elements having a restricted orifice and having pressure differential means carried thereby and movable relative thereto to effect a transfer of fluid through said orifice as a function of the rate of application of pressure between said elements, and means for adjusting said orifice opening.

7. In a shock absorber having two relatively movable elements forming a working chamber and a reservoir chamber and having an orifice therebetween through which fluid is transferred from one chamber to the other to absorb energy, one of said elements having a restricted orifice and a piston member carried by said element and movable relative thereto for effecting a transfer of fluid through said second mentioned orifice as a function of the rate of change of pressure between said chambers to thereby control the restriction of said first mentioned orifice in accordance with said rate of change of pressure, and means for adjusting said second mentioned orifice.

8. In a shock absorber having two relatively movable elements forming a working chamber and a reservoir chamber and having an orifice therebetween through which fluid is transferred from one chamber to the other to absorb energy, one of said elements having a restricted orifice and a piston member associated with said orifice for effecting a transfer of fluid through said second mentioned orifice as a function of the rate of change of pressure between said chambers to thereby control the restriction of said first mentioned orifice in accordance with said rate of change of pressure, and means for adjusting said second mentioned orifice externally of the shock absorber.

9. In a shock absorber adapted for use in connection with a resilient suspension medium and having two relatively movable elements and an orifice through which fluid is transferred to dissipate energy, means carried by one of said elements and movable relative thereto as a function of the rate of change of pressure between said elements, and correlated in its movement with said orifice in such a manner as to prevent the flow of fluid through said orifice during an interval of time corresponding to a material predetermined deflection of the resilient suspension medium, and for thereafter establishing communication through said orifice.

10. In a shock absorber adapted for use in connection with a resilient suspension medium and having two relatively movable elements and an orifice through which fluid is transferred to dissipate energy, hydraulic resistance controlled means carried by one of said elements and movable relative thereto as a function of the rate of change of pressure between said elements, and correlated in its movement with said orifice in such a manner as to prevent the flow of fluid through said orifice during an interval of time corresponding to the maximum allowable deflection of the resilient suspension medium, and for thereafter establishing communication through said orifice.

11. A shock absorber comprising, in combination with a resilient suspension medium, two chambers, one of said chambers being filled with liquid, a plunger movable in said chamber filled with liquid, a hydraulic resistance controlled, pressure differential valve slidably mounted in said plunger in a normally closed position and being adapted to operate in response to the rate of application of pressure so as to prevent communication between the chambers until the instant when the resilient suspension medium has been deflected to a predetermined material value in accordance with the time deflection curve characteristic of said resilient suspension medium.

12. In a shock absorber adapted for use in connection with a resilient suspension medium, having two relatively movable elements forming a working chamber and a reservoir chamber and an orifice therebetween through which fluid is transferred to dissipate energy, liquid displacing means carried by one of said elements and movable relative thereto to prevent the flow of fluid from one chamber to another consistent with a minimum displacement of liquid by said liquid displacing means to thereby reduce to a minimum the relative movement between said elements during an interval of time corresponding to a predetermined deflection of the resilient suspension medium and for thereafter establishing communication through said orifice.

13. In a shock absorber adapted for use in connection with a resilient suspension medium and having two relatively movable elements and an orifice therebetween through which fluid is transferred by said elements to dissipate energy, means movable relative to and carried by one of said elements to prevent the transfer of fluid through said orifice during an interval of time corresponding to a predetermined material deflection of the resilient suspension medium and thereafter for establishing communication through said orifice and separate means for controlling the flow of fluid therethrough.

14. In a shock absorber adapted for use in connection with a resilient suspension medium for absorbing energy and having two relatively movable elements and an orifice therebetween through which fluid is transferred by said elements to dissipate energy, means movable relative to and carried by one of said elements to prevent the transfer of fluid through said orifice during an interval of time corresponding to a predetermined deflection of the resilient suspension medium and thereafter for establishing communication through said orifice, and means correlated with the displacement of said two movable elements cooperating with said orifice to vary the cross-sectional area thereof in predetermined relation to the stroke.

15. In a shock absorber adapted for use in connection with a resilient suspension medium and having two relatively movable elements and a restricted orifice therebetween through which fluid is transferred by said elements to absorb energy, means movable relative to and carried by one of said elements to prevent the transfer of fluid through said orifice during an interval of time corresponding to a predetermined deflection of the resilient suspension medium and thereafter for establishing communication through said orifice, and a metering pin carried by the other of said elements cooperating with said orifice to control the transfer of fluid through said orifice in such a manner as to maintain a substantially constant load on the shock absorber throughout a major portion of the stroke.

16. In a shock absorber adapted for use in connection with a resilient suspension medium and having two relatively movable elements forming a working chamber and a reservoir chamber and having an orifice therebetween through which fluid is transferred by said elements to dissipate energy, valve means responsive to the rate of application of pressure carried by and movable relatively to one of said elements for controlling said orifice in such a manner as to prevent the flow of fluid from the working chamber to the reservoir chamber for a predetermined time interval corresponding to the deflection value of the time deflection curve characteristic of the resilient suspension medium to thereby produce an abruptly increasing resistance during the deflection of the resilient suspension medium and for further controlling said orifice in relation to the relative movement of the shock absorber elements to enable flow of fluid from said working chamber to said reservoir chamber to prevent further increase in resistance between said elements after said suspension medium has been substantially fully deflected.

17. In a shock absorber adapted for use in connection with a resilient suspension medium and having two relatively movable collapsible elements and an orifice therebetween through which fluid is forced by said elements to dissipate energy, hydraulic resistance controlled metering means correlated with said orifice in such a manner as to control same for preventing the flow of fluid therethrough at any partially collapsed static position of the relatively movable shock absorber elements during a material deflection of the resilient suspension medium resulting in an abrupt increase of the shock absorber load, and for thereafter establishing communication through said orifice.

18. A shock strut comprising, in combination, a resilient suspension medium and a shock absorber having two relatively movable elements and an orifice through which fluid is transferred to dissipate energy, a resilient medium associated with said shock absorber to maintain said relatively movable elements in a partially distended position under normal load, and hydraulic resistance controlled means correlated with said orifice in such manner as to prevent the flow of fluid through said orifice during an interval of time corresponding to a predetermined material deflection of the resilient suspension medium at any static position of the relatively movable shock absorber elements and for thereafter establishing communication through said orifice.

19. A shock strut comprising, in combination, a resilient suspension medium and a shock absorber having two relatively movable elements and an orifice through which fluid is transferred to dissipate energy, a resilient medium associated with said shock absorber to maintain said relatively movable elements in different distended static positions, pressure differential valve means and hydraulic resistance means adapted to control the operation of said pressure differential means in response to the rate of change of pressure between said elements, said pressure differential valve means and said hydraulic resistance means being correlated with said orifice in such a manner as to prevent the flow of fluid through said orifice during an interval of time corresponding to a predetermined material deflection of the resilient suspension medium at any static position of the relatively movable shock absorber elements and for thereafter establishing communication through said orifice.

20. A shock strut comprising, in combination, a resilient suspension medium and a shock absorber having two relatively movable elements and an orifice through which fluid is transferred to dissipate energy, a resilient medium associated with said shock absorber to maintain said relatively movable elements in a plurality of distended static positions, said shock absorber having means associated with one of said elements to prevent the flow of fluid through said orifice during an interval of time corresponding to a predetermined deflection of the resilient suspension medium at any static position of the relative movable shock absorber elements and for thereafter establishing communication through said orifice, and a metering pin carried by the other of said elements cooperating with said orifice to control the transfer of fluid through said orifice in such a manner as to maintain a substantially constant load on the shock absorber throughout a major portion of the stroke.

21. A hydraulic-pneumatic shock absorber comprising two relatively movable liquid displacing elements forming a working chamber and a reservoir chamber, said working chamber being filled with liquid, compressed gas in said reservoir chamber, an orifice between said chambers through which fluid is transferred by said elements to dissipate energy, a metering pin adapted to cooperate with said orifice to control the transfer of fluid from said working chamber to said reservoir chamber in such a manner as to maintain a constant load on the shock absorber throughout a major portion of the stroke thereof, and valve means to close said orifice at any static position of the relatively movable shock absorber elements.

22. A shock strut comprising, in combination, a resilient suspension medium and a hydraulic-pneumatic shock absorber having two relatively movable elements and an orifice through which fluid is forced by said elements to dissipate energy and having hydraulic resistance controlled, pressure differential valve means correlated with said orifice in such a manner as to prevent the flow of fluid through said orifice during an interval of time corresponding to a predetermined material deflection of the resilient suspension medium at any static position of the relatively movable shock absorber elements and for thereafter establishing communication through said orifice.

23. In a shock absorber adapted for use in connection with a resilient suspension medium and having two relatively movable elements and a restricted orifice through which fluid is transferred to absorb energy, means carried by one of said elements and movable relative thereto to prevent the flow of fluid through said orifice during an interval of time corresponding to a predetermined deflection of the resilient suspension medium, and for thereafter establishing communication through said orifice, and means for adjusting said first mentioned means to vary the said interval of time in accordance with the time deflection characteristic of the resilient suspension medium.

24. A shock absorber adapted for use in connection with a resilient suspension medium comprising, in combination, two relatively movable elements forming a working chamber and a reservoir chamber, a quantity of fluid in said working chamber, a restricted orifice through which said fluid is transferred to absorb energy, means to prevent the flow of fluid through said orifice during an interval of time corresponding to a predetermined deflection of the resilient suspension medium and for thereafter establishing communication through said orifice, and means for adjusting externally of the shock absorber said first mentioned means to vary the said interval of time in accordance with the time deflection characteristic of the resilient suspension medium.

25. In a shock absorber adapted for use in connection with a resilient suspension medium and having two relatively movable elements and a restricted orifice through which fluid is transferred to absorb energy, valve means carried by one of said elements and movable relative thereto to prevent the flow of fluid through said orifice during an interval of time corresponding to a predetermined deflection of the resilient suspension medium and for thereafter establishing communication through said orifice, means associated with said valve means for timing the opening of said valve means in accordance with the load characteristic of the resilient suspension medium, and means for adjusting externally of the shock absorber said associated means to vary the said interval of time in accordance with the time deflection characteristic of the resilient suspension medium.

26. In a shock absorber adapted for use in connection with a resilient suspension meduim and having two relatively movable elements and a restricted orifice through which fluid is transferred to absorb energy, means carried by one of said elements and movable relative thereto, including a pilot time-control means to prevent the flow of fluid through said orifice during an interval of time corresponding to a predetermined deflection of the resilient suspension medium, and for thereafter establishing communication through said orifice, and means for adjusting said pilot control means to vary the said interval of time in accordance with the time deflection characteristic of the resilient suspension medium.

27. In a shock absorber adapted for use in connection with a resilient suspension medium and having two relatively movable elements and a restricted orifice through which fluid is transferred to absorb energy, pressure differential valve means carried by one of said elements and movable relative thereto, and an adjustable pilot time-control means associated with said valve means, to prevent the flow of fluid through said orifice during an interval of time corresponding to a predetermined deflection of the resilient suspension medium, and for thereafter establishing communication through said orifice, and means cooperating with said orifice to vary the cross-sectional area thereof in a predetermined manner with relation to the stroke.

28. In a hydraulic shock absorber adapted for use in connection with a resilient suspension medium and having two relatively movable elements and a restricted orifice through which fluid is transferred to absorb energy, a pilot controlled pressure differential valve means carried by one of said elements and movable relative thereto to prevent the flow of fluid through said orifice during an interval of time corresponding to a predetermined deflection of the resilient suspension medium and for thereafter establishing communication through said orifice, and a metering pin carried by the other of said elements cooperating with said orifice to control the transfer of fluid through said orifice in such a manner as to maintain a substantially constant load on the shock absorber throughout a major portion of the stroke, and means for adjusting said pilot controlled valve to vary the said interval of time in accordance with the time deflection characteristic of the resilient suspension medium.

29. In a shock absorber having two relatively movable elements forming a working chamber and a reservoir chamber, and having an orifice therebetween through which fluid is transferred from one chamber to the other to dissipate energy, a second orifice and a piston member carried by one of said elements, said piston member being movable relative thereto for effecting a transfer of fluid through said second mentioned orifice as a function of the rate of change of pressure between said chambers and being adapted to thereby regulate said first mentioned orifice to delay the opening thereof for the time required to develop a predetermined load in accordance with a predetermined time deflection curve characteristic.

30. In a shock absorber adapted for use in connection with a resilient suspension medium having two relatively movable elements forming a working chamber and a reservoir chamber and having an effective orifice therebetween through which fluid is transferred from one chamber to the other to dissipate energy, said orifice constituting the sole means of communication between said chambers, a second orifice and a piston member carried by one of said elements, said piston member being movable relative thereto for effecting a transfer of fluid through said second mentioned orifice in such a manner as to prevent the flow of fluid through said first mentioned orifice during an interval of time corresponding to a material predetermined deflection of the resilient suspension medium and for thereafter establishing communication through said orifice.

31. In a shock absorber adapted for use in connection with a resilient suspension medium having two relatively movable elements forming a working chamber and a reservoir chamber and having a restricted orifice therebetween through which fluid is transferred from one chamber to the other to absorb energy, a second restricted orifice and a piston member carried by one of said elements and movable relative thereto for effecting a transfer of fluid through said second mentioned orifice in such a manner as to prevent the flow of fluid through said first mentioned orifice during an interval of time corresponding to a predetermined deflection of the resilient suspension medium and for thereafter establishing communication through said orifice, and a metering pin carried by the other of said elements cooperating with said first mentioned orifice to control the transfer of fluid through said orifice in such a manner as to maintain a substantially constant load on the shock absorber throughout a major portion of the stroke.

32. A shock strut comprising, in combination, a resilient suspension medium and shock absorber having two relatively movable elements forming a working chamber and a reservoir chamber and having a path of communication therebetween through which fluid is transferred to dissipate energy, a resilient medium associated with said shock absorber to maintain said relatively movable elements in a partially distended position under normal load, said shock absorber having an hydraulic resistance controlled valve means comprising an auxiliary chamber having a restricted orifice therein and a piston member movable in said chamber for effecting the transfer of fluid through said restricted orifice as a function of the rate of application of pressure, said valve means controlling said path of communication in such a manner as to prevent the flow of fluid between said chamber until a material predetermined load is established in said shock absorber and to thereafter establish communication through said orifice.

33. In a shock absorber, a pair of relatively movable elements, one of said elements having an orifice therein through which fluid is transferred to dissipate energy and having pressure differential means comprising a piston valve member movable relative to said element and adapted to normally close said orifice and to open said orifice when a predetermined material load is established in said shock absorber, yielding means to return said piston valve to the normal position thereof when said load is dissipated.

34. In a shock absorber adapted for use in connection with a resilient suspension medium and having two relatively movable elements and an orifice through which fluid is transferred to dissipate energy and having pressure differential means comprising a piston valve member carried by one of said elements and movable relative thereto adapted to normally close said orifice and to open said orifice after the interval time required to deflect said resilient suspension medium for a predetermined load in accordance with the time deflection curve characteristic of said resilient suspension medium, yielding means to return said piston valve to the normal position thereof when said load is dissipated.

35. A shock absorber comprising two chambers, one of said chambers being filled with liquid, a plunger movable in said chamber filled with liquid, a pressure differential valve slidably mounted in said plunger having therein a path of communication between said chambers, said valve being adapted to normally seat in a closed position in said plunger and to move relative to said plunger in response to the rate of application of pressure difference between said chambers to render said path of communication effective.

THÉOPHILE DE PORT.